US011225428B2

(12) United States Patent
Tsukamoto et al.

(10) Patent No.: US 11,225,428 B2
(45) Date of Patent: Jan. 18, 2022

(54) GLASS ARTICLE MANUFACTURING METHOD

(71) Applicant: Nippon Electric Glass Co., Ltd., Shiga (JP)

(72) Inventors: Akiyuki Tsukamoto, Shiga (JP); Kazuyuki Tenyama, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 0 days.

(21) Appl. No.: 16/645,054

(22) PCT Filed: Aug. 17, 2018

(86) PCT No.: PCT/JP2018/030575
§ 371 (c)(1),
(2) Date: Mar. 6, 2020

(87) PCT Pub. No.: WO2019/054126
PCT Pub. Date: Mar. 21, 2019

(65) Prior Publication Data
US 2021/0122657 A1    Apr. 29, 2021

(30) Foreign Application Priority Data

Sep. 13, 2017  (JP) .............................. JP2017-175770

(51) Int. Cl.
*C03B 5/027* (2006.01)
*C03B 5/26* (2006.01)
C03B 3/00 (2006.01)

(52) U.S. Cl.
CPC .............. *C03B 5/027* (2013.01); *C03B 5/265* (2013.01)

(58) Field of Classification Search
CPC .. C03B 5/027; C03B 5/03; C03B 5/04; C03B 5/182; C03B 5/185; C03B 5/193;
(Continued)

(56) References Cited

U.S. PATENT DOCUMENTS 3,885,945 A    5/1975  Rees et al.
3,961,126 A *  6/1976  Maddux ............... H05B 3/0023
                                                        373/40
(Continued)

FOREIGN PATENT DOCUMENTS

JP    50-133214    10/1975
JP    59-26931     2/1984
(Continued)

OTHER PUBLICATIONS

International Preliminary Report on Patentability and Written Opinion of the International Searching Authority dated Mar. 17, 2020 in International (PCT) Application No. PCT/JP2018/030575.
(Continued)

*Primary Examiner* — Hung D Nguyen
(74) *Attorney, Agent, or Firm* — Wenderoth, Lind & Ponack, L.L.P.

(57) ABSTRACT

Provided is a manufacturing method for a glass article, including: a supply step of supplying glass raw materials (4) onto a molten glass (2) accommodated in a melting chamber (3) of a glass melting furnace (1); a melting step of melting the supplied glass raw materials (4) through heating; and an outflow step of causing the molten glass (2) to flow outside the melting chamber (3), wherein the glass raw materials (4) supplied from one screw feeder (5) and another screw feeder (5), which are adjacent to each other out of a plurality of screw feeders (5), extend in parallel through intermediation of a gap (6) on the molten glass (2), and wherein the glass raw materials (4) are melted through heating only with an electrode (8) and an electrode (9) each immersed in the molten glass (2) in the melting chamber (3).

3 Claims, 3 Drawing Sheets

(58) Field of Classification Search
CPC ........... C03B 5/20; C03B 5/225; C03B 5/235; C03B 5/237; C03B 5/24; C03B 5/245; C03B 5/265
USPC .............. 373/27–41; 65/134.1, 135.7, 135.9, 65/136.2, 335, 482, 540
See application file for complete search history.

(56) References Cited

U.S. PATENT DOCUMENTS

| | | | | |
|---|---|---|---|---|
| 4,432,780 | A | * | 2/1984 | Propster .................... C03B 3/00 65/335 |
| 4,531,218 | A | * | 7/1985 | Williamson ......... H05B 3/0023 373/39 |
| 6,085,551 | A | * | 7/2000 | Pieper ....................... C03B 5/04 373/122 |
| 2009/0044567 | A1 | * | 2/2009 | Johnson .................. C03B 5/245 65/29.17 |

FOREIGN PATENT DOCUMENTS

| | | |
|---|---|---|
| JP | 1-164735 | 11/1989 |
| JP | 9-208228 | 8/1997 |
| JP | 2003-183031 | 7/2003 |
| JP | 2004-91232 | 3/2004 |
| JP | 5282619 | 9/2013 |

OTHER PUBLICATIONS

International Search Report dated Nov. 13, 2018 in International (PCT) Application No. PCT/JP2018/030575.
Office Action dated Oct. 15, 2021 in corresponding Chinese Application No. 201880056597.8 with English translation of Search Report.

* cited by examiner

GLASS ARTICLE MANUFACTURING METHOD

TECHNICAL FIELD

The present invention relates to a manufacturing method for a glass article.

BACKGROUND ART

As is well known, a glass article typified by a glass sheet, a glass tube, a glass fiber, and the like is manufactured by forming molten glass generated by melting a glass raw material in a glass melting furnace into a predetermined shape.

As an example of a method of generating molten glass with a view to manufacturing a glass article, there may be given a method involving: a supply step of supplying a glass raw material onto molten glass accommodated in a melting chamber of a glass melting furnace; a melting step of melting the supplied glass raw material through heating; and an outflow step of causing the molten glass to flow outside the melting chamber.

In this connection, in Patent Literature 1, there is disclosed a mode of performing the supply step. In the mode illustrated in FIG. 6 of Patent Literature 1, a plurality of supply units (in this case, screw feeders) are mounted in parallel, and the supplying a glass raw material is performed so that glass raw materials supplied from one supply unit and the other supply unit, which are adjacent to each other, extend in parallel through intermediation of a gap on the molten glass.

According to such mode, an improvement in quality of a glass article can be expected. However, according to Patent Literature 1, in the mode in which the glass raw materials extend in parallel through intermediation of a gap on the molten glass, the glass raw materials on the molten glass are liable to meander, with the result that the width of the gap formed between the glass raw materials is liable to be increased. As a result, the molten glass varies in molten state inappropriately, and a defect occurs in a glass article formed from the molten glass.

In view of the foregoing, in Patent Literature 1, there is proposed that a separation dimension between the plurality of screw feeders is set to more than one time to four and a half times or less as large as an opening width dimension of a raw material feed port. With this, the glass raw materials supplied from the plurality of screw feeders are integrated with each other on the molten glass and flow under that state. With this, the inappropriate variation in molten state of the molten glass can be suppressed.

CITATION LIST

Patent Literature 1: JP 5282619 B2

SUMMARY OF INVENTION

Technical Problem

When the separation dimension between the plurality of screw feeders is set to more than one time to four and a half times or less as large as the opening width dimension of the raw material feed port as proposed in Patent Literature 1, the inappropriate variation in molten state of the molten glass can be suppressed, but removal of bubbles in the molten glass is liable to be insufficient. As a result, the quality of the glass article is reduced. Therefore, it is required that, while the inappropriate variation in molten state of the molten glass is suppressed, removal of bubbles contained in the molten glass be promoted to improve the quality of the glass article through achievement of a mode in which the glass raw materials extend in parallel through intermediation of a gap on the molten glass.

The present invention has been made in view of the above-mentioned circumstances, and a technical object of the present invention is to, in melting a glass raw material supplied onto molten glass in a melting chamber of a glass melting furnace to generate molten glass and causing the molten glass to flow outside the melting chamber, to thereby manufacture a glass article from the molten glass, improve the quality of the glass article.

Solution to Problem

According to one embodiment of the present invention, which has been devised to achieve the above-mentioned object, there is provided a manufacturing method for a glass article, comprising: a supply step of supplying glass raw materials onto molten glass accommodated in a melting chamber of a glass melting furnace from a plurality of supply units mounted to a front wall of the melting chamber in parallel; a melting step of melting the supplied glass raw materials through heating; and an outflow step of causing the molten glass to flow outside the melting chamber from an outflow port provided at a rear wall of the melting chamber, wherein the glass raw materials supplied from one supply unit and another supply unit, which are adjacent to each other out of the plurality of supply units, extend in parallel through intermediation of a gap on the molten glass, and wherein the glass raw materials are melted through heating only with electrodes each immersed in the molten glass in the melting chamber.

The inventor of the present invention has made extensive investigations, and as a result, has found that the meandering of the glass raw materials supplied onto the molten glass is caused by applying flame of a burner above the surface of the molten glass in order to melt the glass raw materials. Moreover, the inventor has found that the meandering of the glass raw materials is caused by convection of a gas generated in the melting chamber in association with the use of the burner. Based on those findings, in the method of the one embodiment of the present invention, the glass raw materials supplied onto the molten glass in the supply step are melted through heating only with the electrodes each immersed in the molten glass in the melting step. With this, an influence caused by the use of the burner can be eliminated, and the meandering of the glass raw materials on the molten glass can be prevented. With this, with regard to the gap, which is formed between the glass raw materials supplied from one supply unit and the other supply unit, which are adjacent to each other in the supply step, the width of the gap can be maintained within an appropriate range. Therefore, in the method according to the one embodiment of the present invention, a state in which the glass raw materials are dispersed on the molten glass is achieved, and hence variation in quality of the molten glass can be reduced. In addition, the meandering of the glass raw materials on the molten glass can be prevented, and hence inappropriate variation in molten state of the molten glass can be suppressed. Further, when the gap is formed, the removal of bubbles in the molten glass can be promoted. As a result, the quality of a glass article to be manufactured can be improved.

In the above-mentioned method, it is preferred that the electrodes comprise a plurality of pairs of rod-shaped electrodes, and the plurality of pairs of rod-shaped electrodes be arranged so that an expected flow passage through which the glass raw material supplied from the supply unit flows in the melting chamber passes between one rod-shaped electrode and another rod-shaped electrode forming each pair of the plurality of pairs.

With this, each of the glass raw materials supplied from the corresponding supply unit easily and reliably flows along the expected flow passage. With this, the gap, which is formed between the glass raw materials supplied from one supply unit and the other supply unit, which are adjacent to each other, is easily and stably maintained. In addition, the expected flow passage passes between the one electrode and the other electrode forming each pair of the plurality of electrode pairs, and hence each of the glass raw materials can be efficiently heated along the expected flow passage during flowing.

In the above-mentioned method, it is preferred that a distance from the front wall to the rod-shaped electrode closest to the front wall be set to be shorter than an inter-electrode distance between the rod-shaped electrodes, which are adjacent to each other in a flowing direction of the glass raw material.

With this, the glass raw materials present in a portion in which the glass raw materials are liable to be stacked on each other on the molten glass (in the vicinity of the front wall having mounted thereto the supply units) are easily heated. With this, the following risk can be properly eliminated: it becomes difficult to supply a fresh glass raw material onto the molten glass owing to inhibition by the glass raw materials having been stacked on each other.

Advantageous Effects of Invention

According to the present invention, in melting a glass raw material supplied onto molten glass in a melting chamber of a glass melting furnace to generate molten glass and causing the molten glass to flow outside the melting chamber, to thereby manufacture a glass article from the molten glass, the quality of the glass article can be improved.

DESCRIPTION OF EMBODIMENTS

Referring to the accompanying drawings, a manufacturing method for a glass article according to an embodiment of the present invention is described below.

First Embodiment

First, a glass melting furnace to be used in a manufacturing method for a glass article according to a first embodiment of the present invention is described.

Figure 1:
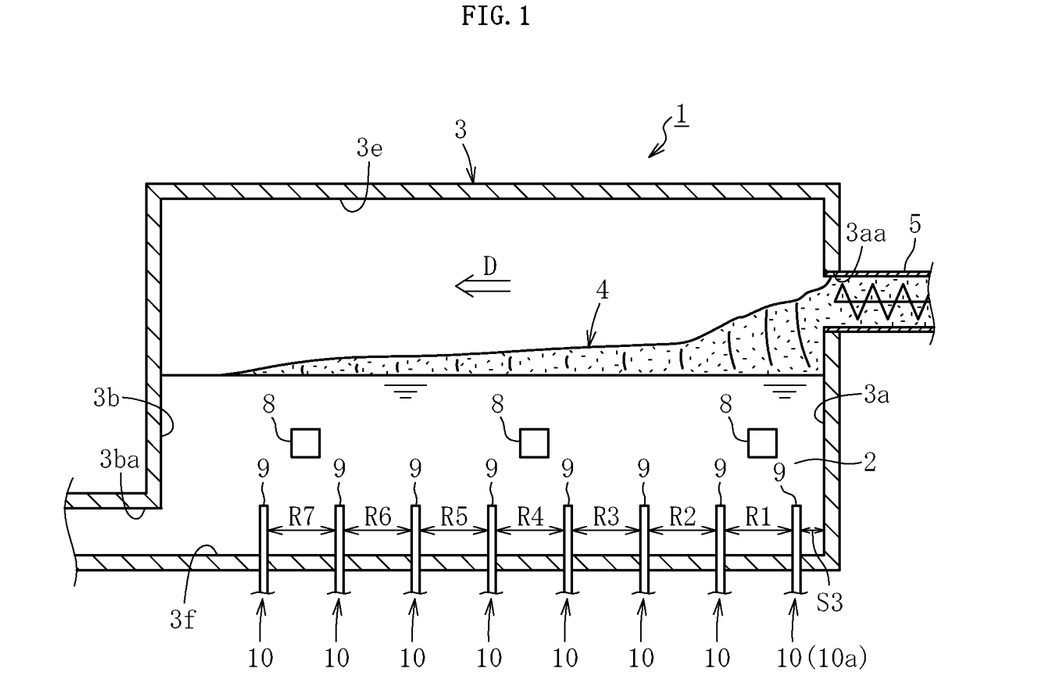
FIG. 1 is a longitudinal sectional side view for illustrating a manufacturing method for a glass article according to a first embodiment of the present invention.
Figure 2:
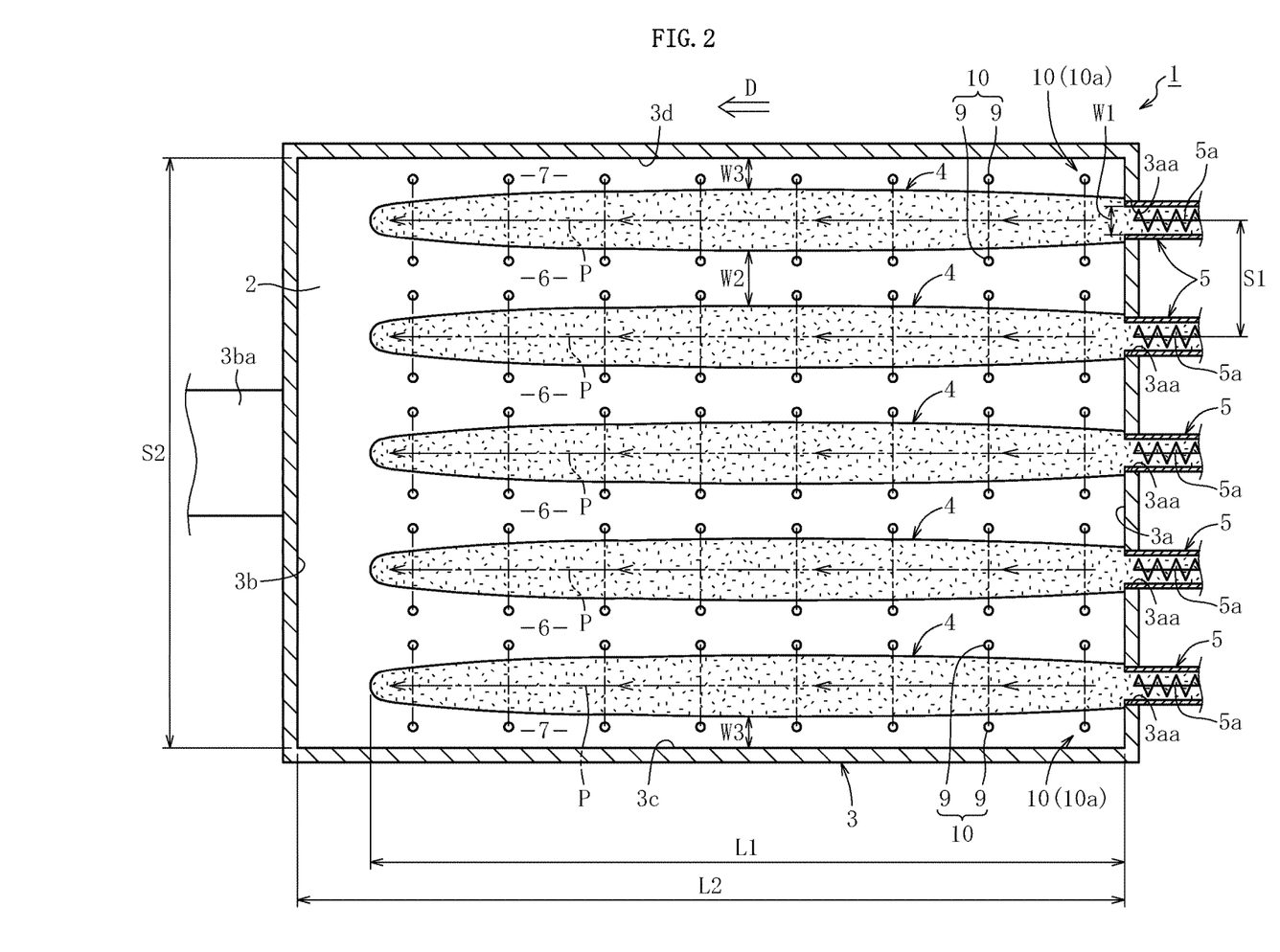
FIG. 2 is a transverse sectional plan view for illustrating the manufacturing method for a glass article according to the first embodiment of the present invention.

As illustrated in FIG. 1 and FIG. 2, a glass melting furnace 1 is configured as an electric melting furnace, and comprises a melting chamber 3 capable of accommodating a molten glass 2. The glass melting furnace 1 is configured to heat a glass raw material 4 continuously supplied onto the molten glass 2 in the melting chamber 3 to successively melt the glass raw material 4, and is also configured to cause the molten glass 2 to continuously flow outside the melting chamber 3.

The melting chamber 3 is formed of a refractory material, and has a rectangular sectional shape in plan view. In addition, the melting chamber 3 comprises: a front wall 3$a$ located at an upstream end and a rear wall 3$b$ located at a downstream end in a flowing direction D of the glass raw material 4 in the melting chamber 3 (hereinafter simply represented as "flowing direction D"); a pair of side walls 3$c$ and 3$d$; a ceiling wall 3$e$; and a bottom wall 3$f$.

Screw feeders 5 each serving as a supply unit configured to supply the glass raw material 4 are mounted to the front wall 3$a$ in parallel. In this embodiment, five screw feeders 5 are arranged in parallel in a width direction perpendicular to the flowing direction D (hereinafter simply represented as "width direction"). Each of the screw feeders 5 is inserted into an opening 3$aa$ formed in the front wall 3$a$ without forming a gap. In addition, the amount of the glass raw material 4 to be supplied from each of the screw feeders 5 can be freely adjusted. A distance S1 between central axes 5$a$ of screw feeders 5 and 5, which are adjacent to each other along the width direction, is set so that, when an opening width W1 of a distal end of each of the screw feeders 5 is used as a standard, the relationship of $W1<S1\leq 10\times W1$ is satisfied.

The glass raw materials 4 and 4 supplied from one and the other of the screw feeders 5 and 5, which are adjacent to each other, extend in parallel along the flowing direction D on the molten glass 2. Moreover, a gap 6 in which the glass raw material 4 is not present (the surface of the molten glass 2 is exposed) is formed between those glass raw materials 4 and 4. With this, each of the glass raw materials 4 and 4 flows from a front wall 3$a$ side to a rear wall 3$b$ side along an expected flow passage P extending in parallel with the flowing direction D without joining with each other in the course of their flowing. A gap 7 in which the glass raw material 4 is not present is also formed between the side wall 3$c$ and the glass raw material 4 closest to the side wall 3$c$ and between the side wall 3$d$ and the glass raw material 4 closest to the side wall 3$d$.

Each of the "gap 6" and "gap 7" as used herein means a portion in which particles of the glass raw material 4 are melted and are not present on the surface of the molten glass 2. In addition, the "portion in which the glass raw material 4 before melting is present" means a portion in which the particles of the glass raw material 4 are present on the surface of the molten glass 2. A discrimination procedure therefor is described later.

An outflow port 3$ba$ configured to cause the molten glass 2 to flow outside is formed on the rear wall 3$b$.

A plurality of sheet-shaped electrodes 8 each configured to heat the molten glass 2 through application of a current are mounted to each of the pair of side walls 3$c$ and 3$d$ under the state in which the plurality of electrodes 8 are immersed in the molten glass 2. The pair of side walls 3$c$ and 3$d$ are located so as to be spaced apart from each other at a distance S2 in the width direction. A plurality of rod-shaped electrodes 9 each configured to heat the molten glass 2 through application of a current are mounted to the bottom wall 3$f$ under the state in which the plurality of electrodes 9 are immersed in the molten glass 2.

In addition, energy (heat energy imparted to the molten glass 2) generated with the electrodes 8 and 9 may be adjusted by adjusting a voltage applied to the electrodes 8 and 9. In association with the heating of the molten glass 2 with the electrodes 8 and 9, the glass raw materials 4 on the molten glass 2 are indirectly heated to be melted. With this, a fresh molten glass 2 is successively generated.

Each of the plurality of rod-shaped electrodes 9 has a rod-shaped electrode 9 serving as its pair for application of a current, and the rod-shaped electrodes 9 forming a pair form an electrode pair 10 (in FIG. 2, the rod-shaped electrodes 9 forming a pair are connected with a long dashed short dashed line). In this embodiment, eight electrode pairs 10 are arranged along each of five expected flow passages P, and one rod-shaped electrode 9 and the other rod-shaped electrode 9 forming each pair of the eight electrode pairs 10 are arranged so as to be spaced apart from each other in the width direction. Moreover, when the surface of the molten glass 2 is seen from the direction of plan view, the one rod-shaped electrode 9 and the other rod-shaped electrode 9 are arranged so that the expected flow passage P passes between these electrodes. Further, in this embodiment, when the surface of the molten glass 2 is seen from the direction of plan view, the overall width of the glass raw material 4 supplied from each of the screw feeders 5 along the width direction is set to fall within the distance between the one rod-shaped electrode 9 and the other rod-shaped electrode 9.

Herein, a distance S3 from the front wall 3a to the electrode pair 10 closest to the front wall 3a (hereinafter represented as "closest electrode pair 10a") along the flowing direction D is set to be shorter than each of inter-electrode distances R1 to R7 between the electrode pairs 10, which are adjacent to each other along the flowing direction D. The distances are set in that manner in order to avoid the stacking of the glass raw materials 4 in the vicinity of the screw feeders 5, to thereby eliminate a risk in that the supply of a fresh glass raw material onto the molten glass 2 is inhibited by the glass raw materials 4 having been stacked on each other. The distance S3 is preferably set within the range of from 100 mm to 2,500 mm. The inter-electrode distances R1 to R7 between the electrode pairs 10, which are adjacent to each other, may be the same or different from each other. Moreover, the inter-electrode distances R1 to R7 between the electrode pairs 10 are each preferably set within the range of from 100 mm to 1,500 mm.

The manufacturing method for a glass article according to the first embodiment using the above-mentioned glass melting furnace 1 is described below.

In the manufacturing method for a glass article, in generating the molten glass 2 with a view to manufacturing a glass article (e.g., a glass sheet, a glass tube, or a glass fiber), the following steps are performed. The composition of the glass article is not particularly limited, but the glass article to be manufactured in this embodiment is formed of alkali-free glass.

In this method, a supply step of supplying the glass raw materials 4 onto the molten glass 2 accommodated in the melting chamber 3 of the glass melting furnace 1 from a plurality of supply units (the screw feeders 5) mounted to the front wall 3a of the melting chamber 3 in parallel; a melting step of melting the supplied glass raw materials 4 through heating; and an outflow step of causing the molten glass 2 to flow outside the melting chamber 3 from the outflow port 3ba provided at the rear wall 3b of the melting chamber 3 are performed.

Moreover, in this method, the glass raw materials 4 are melted through heating only with the electrodes 8 and the electrodes 9 each immersed in the molten glass 2 in the melting chamber 3. Specifically, the molten glass 2 is heated only with the electrodes 8 and the electrodes 9, and thus the glass raw materials 4 on the molten glass 2 are indirectly heated to be melted. The glass raw materials 4 are heated only with the electrodes 8 and the electrodes 9 after the continuous generation of the molten glass 2 is started. In a stage before the continuous generation of the molten glass 2 is started (e.g., at the time of start-up of the glass melting furnace 1), the glass raw materials 4 may be heated with, for example, burners (illustration thereof is omitted) mounted to the side walls 3c and 3d.

The main action and effect exhibited by the above-mentioned manufacturing method for a glass article are described below.

In the above-mentioned method, the glass raw materials 4 supplied onto the molten glass 2 in the supply step are melted through heating only with the electrodes 8 and the electrodes 9 each immersed in the molten glass 2 in the melting step, and thus the meandering of the glass raw materials 4 on the molten glass 2 can be prevented. With this, with regard to the gap 6 formed between the glass raw materials 4 supplied from one and the other of the screw feeders 5 and 5, which are adjacent to each other, a width dimension W2 of the gap can be maintained within an appropriate range. Therefore, according to this method, a state in which the glass raw materials 4 are dispersed on the molten glass 2 is achieved, and hence variation in quality of the molten glass 2 can be reduced. In addition, the meandering of the glass raw materials 4 on the molten glass 2 can be prevented, and hence inappropriate variation in molten state of the molten glass 2 can be suppressed. Further, when the gap 6 is formed, the removal of bubbles in the molten glass 2 can be promoted. As a result, the quality of a glass article to be manufactured can be improved.

When the glass raw materials 4 are melted through heating only with the electrodes 8 and the electrodes 9 each immersed in the molten glass 2, the atmosphere in the glass melting furnace 1 is dry as compared to the case of using combustion with a burner in combination. Therefore, moisture in the atmosphere can be prevented from being dissolved in the molten glass 2, and thus the β-OH value of the glass article to be obtained can be reduced. With this, compaction at the time of heating the glass article to be obtained can be reduced, and a glass article suitable as a glass substrate for a display can be obtained.

In addition, in this method, from the viewpoint of promoting the dispersion of the glass raw materials 4 on the molten glass 2, the width dimension W2 of the gap 6 is preferably adjusted to 700 mm or less, and a width dimension W3 of the gap 7 is preferably adjusted to 1,300 mm or less. In addition, from the viewpoint of further promoting the removal of bubbles in the molten glass 2, the width dimension W2 is preferably adjusted to 10 mm or more, and the width dimension W3 is preferably adjusted to 100 mm or more. The width dimensions W2 and W3 may each be adjusted, for example, by changing at least one of: the supply amount of the glass raw material 4 by each of the screw feeders 5; the distance S1 between the screw feeders 5; the opening width W1 of each of the screw feeders 5; or energy generated with the electrodes 8 and 9. The measurement methods for the width dimensions W2 and W3 are described later.

From the viewpoint of promoting the dispersion of the glass raw materials 4 on the molten glass 2, a distance L1 from the glass raw material 4 located on a most upstream side to the glass raw material 4 located on a most downstream side in the flowing direction D (the distance L1 is equal to a distance from the front wall 3a to the glass raw material 4 located on the most downstream side) is preferably adjusted so that the relationship of $L1 \geq 0.65L2$ is satisfied. The "distance L2" as used herein refers to the length of the surface of the molten glass 2 along the flowing direction D. In addition, from the viewpoint of preventing the glass raw material 4 remaining unmelted from flowing outside, the distance L1 is preferably set to 0.95L2 or less.

The distance L1 may be adjusted, for example, by changing at least one of: the supply amount of the glass raw material 4 by each of the screw feeders 5; or energy generated with the electrodes 8 and 9. In addition, the distance L1 may also be adjusted by changing the distribution of energy generated with the electrodes 9 in the flowing direction D. The measurement method for the distance L1 is described later.

The alkali-free glass has higher viscosity than alkali-containing glass. Therefore, when the alkali-free glass is melted, bubbles are liable to remain in the molten glass. That is, when the present invention is applied to the melting of the alkali-free glass, an improving effect on the quality of the glass article becomes remarkable. Accordingly, the glass article is preferably formed of the alkali-free glass. The "alkali-free glass" as used herein refers to glass substantially free of an alkali component (alkali metal oxide), and specifically refers to glass having a weight ratio of the alkali component of 3,000 ppm or less. In the present invention, the weight ratio of the alkali component is preferably 1,000 ppm or less, more preferably 500 ppm or less, most preferably 300 ppm or less.

A manufacturing method for a glass article according to a second embodiment of the present invention is described below. In the second embodiment, only a difference from the first embodiment is described. With regard to commonalities with the first embodiment, the same reference symbols are assigned in the drawing referred to in the description of the second embodiment, and overlapping description thereof is omitted.

Second Embodiment

Figure 3:
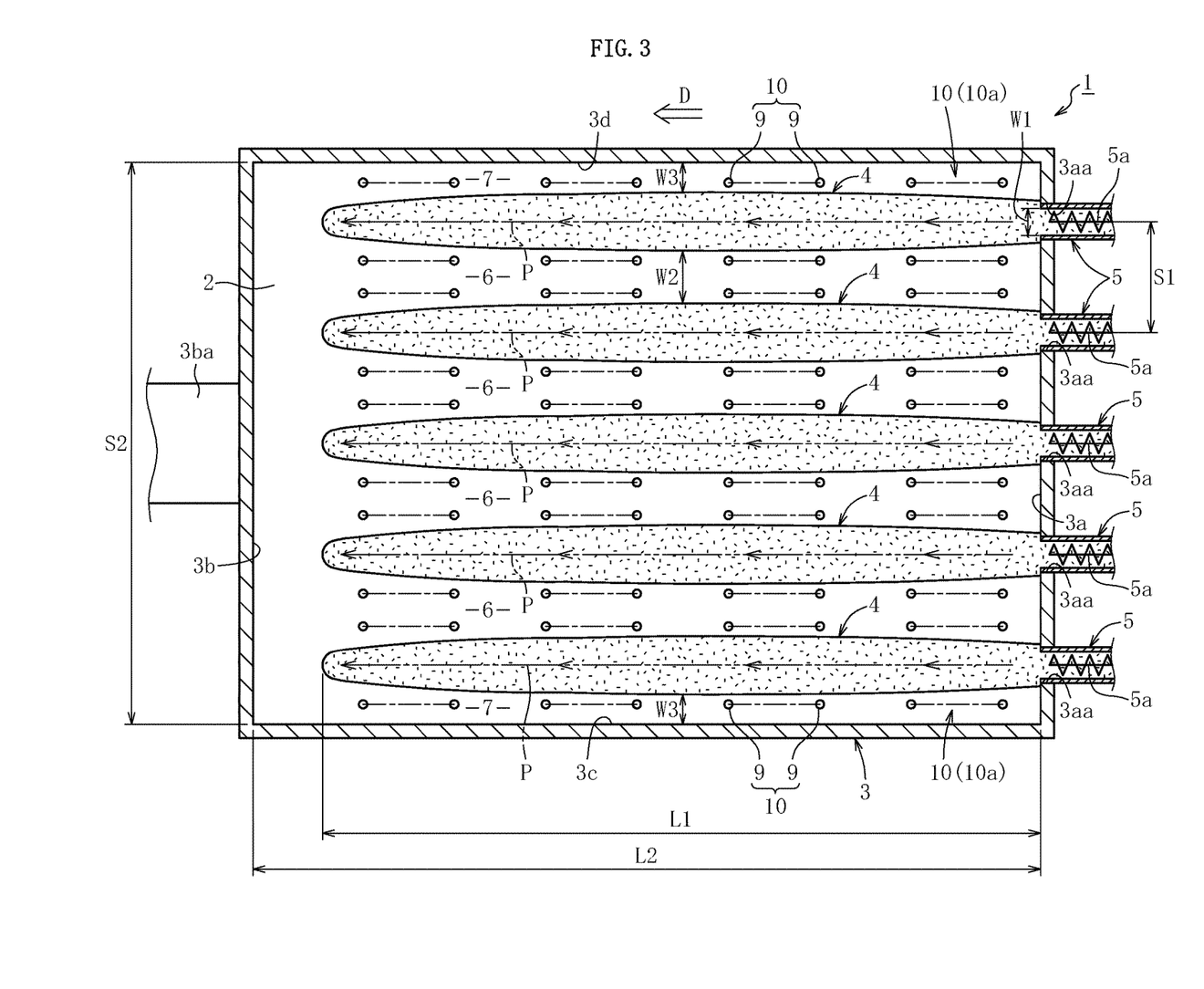
FIG. 3 is a transverse sectional plan view for illustrating a manufacturing method for a glass article according to a second embodiment of the present invention.

As illustrated in FIG. 3, the manufacturing method for a glass article according to the second embodiment differs from that of the first embodiment in that the one electrode 9 and the other electrode 9 forming each pair of the electrode pairs 10 are arranged so as to be spaced apart from each other not in the width direction but in the flowing direction D (in FIG. 3, the electrodes 9 forming a pair are connected with a long dashed short dashed line). Also by the manufacturing method for a glass article according to the second embodiment, the same main action and effect as in the first embodiment can be obtained.

Herein, the manufacturing method for a glass article according to the present invention is not limited to the modes described in the above-mentioned embodiments. For example, while the screw feeders 5 are used for supplying the glass raw materials 4 in each of the above-mentioned embodiments, a pusher capable of pushing the glass raw materials 4 from an outside to an inside of the melting chamber 3 (front wall 3a) may be used. While the five supply units are used, it is only required to use a plurality of supply units, and for example, two to six supply units may be used.

While the electrodes having different shapes are used in combination by arranging the rod-shaped electrodes 9 and the sheet-shaped electrodes 8 in each of the above-mentioned embodiments, only electrodes having the same shape may be used. In addition, block-shaped electrodes may be used.

<Presence or Absence of Glass Raw Material>

The presence or absence of the glass raw material before melting is determined by the following procedure.
(1) An image is picked up with an image pickup unit (e.g., a camera) configured to collect the surface of the molten glass 2 (including the portion covered with the glass raw material 4 before melting) in the field of view.
(2) In the image having been picked up, a portion in which the glass raw material 4 before melting is present and a portion in which the glass raw material 4 before melting is not present are discriminated from each other based on brightness.

As required, the image having been picked up may be corrected as described in WO 2013/100069 A1.

The brightness serving as a standard in the item (2) of the above-mentioned procedure changes depending on the glass melting furnace, and hence is required to be set for every glass melting furnace.

The brightness serving as a standard is set by the following procedure.
(a) An image is picked up with an image pickup unit configured to collect the surface of the molten glass 2 (including the portion covered with the glass raw material 4 before melting) in the field of view.
(b) Samples are collected from an uppermost layer out of the molten glass 2 and the glass raw material 4 at a plurality of points around an interface between the portion in which the glass raw material 4 before melting is not present and the portion covered with the glass raw material 4 before melting. When a bubble layer is present on the surface, the surface is avoided at the time of collection, for example, with a jig used for sample collection.
(c) The collected samples are each poured into a mold and cooled, followed by being cut, to thereby produce a plurality of samples.
(d) With respect to an arbitrary region measuring 10 mm by 10 mm on a cut surface of each sample, the ratio of the area of the glass raw material remaining unmelted is calculated. In addition, the brightness at each collection position is obtained through use of the image of the item (a).
(e) A relationship between the number of particles of the glass raw material and the brightness is established based on the results obtained in the item (d), and the brightness at which the ratio of the area of the glass raw material remaining unmelted is 30% is determined and used as a standard.

<Measurement of Width Dimensions W2 and W3>

The width dimensions W2 and W3 are each measured by the following procedure.
(a) By the item (2) of the above-mentioned procedure, an image in which the portion in which the glass raw material 4 before melting is present and the portion in which the glass raw material 4 before melting is not present can be discriminated from each other is obtained.
(b) Through use of the image of the item (a), a portion at which the width of the portion in which the glass raw material 4 before melting is not present is smallest in the flowing direction D is determined, and the width dimensions W2 and W3 are calculated based on the widths at the portion.

<Measurement of Distance L1>

The distance L1 is measured by the following procedure.

(a) By the item (2) of the above-mentioned procedure, an image in which the portion in which the glass raw material 4 before melting is present and the portion in which the glass raw material 4 before melting is not present can be discriminated from each other is obtained.

(b) Through use of the image of the item (a), with regard to the portion in which the glass raw material 4 before melting is present, its position on a most downstream side is determined, and the distance L1 is calculated based on the distance from the position to the front wall 3a.

EXAMPLES

In Examples 1 to 4, 100 glass substrates were manufactured according to the same mode as in the first embodiment, and then the rate of occurrence of defects in the glass substrates was examined. In this case, each glass substrate was formed of alkali-free glass in accordance with a glass substrate for a display (product name: OA-11) manufactured by Nippon Electric Glass Co., Ltd. In addition, the rate of occurrence of defects was calculated by dividing the number of occurrence of glass substrates in which a defect was detected by the number of the glass substrates having been manufactured. In Examples 1 to 4, the width W2 of the gap was changed by changing the opening width W1 of a distal end of the screw feeder 5.

In Comparative Example, a burner was additionally mounted to an upper portion of the melting chamber, and the glass raw materials were melted through heating with the burner in combination with the electrodes.

The test conditions and test results are shown in Table 1. The symbol "○" in the "Formation of gap" of Table 1 represents the case in which the glass raw materials supplied from the plurality of screw feeders extend along the flowing direction without joining with each other in the course of their flowing, and thus the gap is formed. The symbol "x" in the "Formation of gap" of Table 1 represents the case in which the glass raw materials supplied from the plurality of screw feeders meander to join with each other in the course of their flowing, and thus the gap is not formed. In addition, in the "Rate of occurrence of defects" of Table 1, the symbol "○" represents the case in which the rate of occurrence of defects is low, and a satisfactory result is obtained, and the symbol "x" represents the case in which the rate of occurrence of defects is high, and an unacceptable result is obtained.

As shown in Table 1, in Comparative Example, owing to the influence of the burner mounted to the upper portion of the melting chamber, the glass raw materials meandered to join with each other, and thus the gap was not formed between the glass raw materials. As a result, the molten glass varied in molten state, with the result that the occurrence of cords in the glass substrates was increased, and the rate of occurrence of defects was inferior. Meanwhile, in each of Examples 1 to 4, in which the glass raw materials were melted through heating only with the electrodes, the glass raw materials extended along the flowing direction, and thus the gap was formed between the glass raw materials. As a result, the occurrence of cords and bubbles in the glass substrates was reduced, and the rate of occurrence of defects in the glass substrates was satisfactory.

From the foregoing, it is inferred that the quality of the glass article can be improved by the manufacturing method for a glass article according to the present invention.

REFERENCE SIGNS LIST 1 glass melting furnace
2 molten glass
3 melting chamber
3a front wall
3b rear wall
3c side wall
3d side wall
3e ceiling wall
3f bottom wall
4 glass raw material
5 screw feeder
6 gap
8 electrode
9 electrode
10 electrode pair
10a closest electrode pair
P expected flow passage
R1 to R7 inter-electrode distance
S3 distance

The invention claimed is:

1. A manufacturing method for a glass article, the manufacturing method comprising:

a supply step of supplying glass raw materials onto molten glass accommodated in a melting chamber of a glass melting furnace from a plurality of supply units mounted to a front wall of the melting chamber in parallel;

a melting step of melting the supplied glass raw materials through heating; and

TABLE 1

| | | Heating conditions | Formation of gap | Width W2 of gap | Distance L1 | Rate of occurrence of defects |
|---|---|---|---|---|---|---|
| Division | Example 1 | Only with electrode | ○ | 10 mm | 0.8L2 | ○ |
| | Example 2 | Only with electrode | ○ | 100 mm | 0.8L2 | ○ |
| | Example 3 | Only with electrode | ○ | 300 mm | 0.8L2 | ○ |
| | Example 4 | Only with electrode | ○ | 600 mm | 0.8L2 | ○ |
| | Comparative Example | Combination with burner | x | — | 0.5L2 | x | an outflow step of causing the molten glass to flow outside the melting chamber from an outflow port provided at a rear wall of the melting chamber, wherein the glass raw materials supplied from one supply unit and another supply unit, which are adjacent to each other out of the plurality of supply units, extend in parallel along a flowing direction of the glass raw materials from a front wall side to a rear wall side through intermediation of a gap on the molten glass, wherein the glass raw materials are melted through heating only with electrodes each immersed in the molten glass in the melting chamber, and wherein when a distance from the front wall to the glass raw material located on a most downstream side along the flowing direction is $L1$ and a length of a surface of the molten glass along the flowing direction is $L2$, $L1$ and $L2$ satisfy a relationship expressed by $0.65 L2 \leq L1 \leq 0.95 L2$.

2. The manufacturing method for a glass article according to claim 1, wherein the electrodes comprise a plurality of pairs of rod-shaped electrodes, and wherein the plurality of pairs of rod-shaped electrodes are arranged so that an expected flow passage through which the glass raw material supplied from one of the supply units flows in the melting chamber passes between one rod-shaped electrode and another rod-shaped electrode forming each pair of the plurality of pairs of rod-shaped electrodes.

3. The manufacturing method for a glass article according to claim 2, wherein a distance from the front wall to one of the rod-shaped electrodes closest to the front wall is set to be shorter than an inter-electrode distance between adjacent pairs of the rod-shaped electrodes in the flowing direction of the glass raw material.

\* \* \* \* \*